No. 607,997. Patented July 26, 1898.
L. KRIEGER.
ELECTRICALLY SELF PROPELLING VEHICLE.
(Application filed Mar. 11, 1897.)
(No Model.) 7 Sheets—Sheet 1.

FIG.1.

Witnesses.
E. B. Gotton
Otto Munk

Inventor:
Louis Krieger
By Richards
his Attorneys.

No. 607,997. Patented July 26, 1898.
L. KRIEGER.
ELECTRICALLY SELF PROPELLING VEHICLE.
(Application filed Mar. 11, 1897.)
(No Model.) 7 Sheets—Sheet 4.

Witnesses:
E. B. Bolton

Inventor:
Louis Krieger
By Richardson
his Attorneys.

No. 607,997. Patented July 26, 1898.
L. KRIEGER.
ELECTRICALLY SELF PROPELLING VEHICLE.
(Application filed Mar. 11, 1897.)
(No Model.) 7 Sheets—Sheet 5.

Witnesses:

Inventor:
Louis Krieger
By Richardson
his Attorneys.

No. 607,997. Patented July 26, 1898.
L. KRIEGER.
ELECTRICALLY SELF PROPELLING VEHICLE.
(Application filed Mar. 11, 1897.)
(No Model.) 7 Sheets—Sheet 6.

Witnesses:
E. B. Bolton

Inventor:
Louis Krieger
By Richards
his Attorneys.

No. 607,997. Patented July 26, 1898.
L. KRIEGER.
ELECTRICALLY SELF PROPELLING VEHICLE.
(Application filed Mar. 11, 1897.)

(No Model.) 7 Sheets—Sheet 7.

UNITED STATES PATENT OFFICE.

LOUIS KRIEGER, OF PARIS, FRANCE.

ELECTRICALLY-SELF-PROPELLING VEHICLE.

SPECIFICATION forming part of Letters Patent No. 607,997, dated July 26, 1898.

Application filed March 11, 1897. Serial No. 627,009. (No model.) Patented in France January 22, 1895, No. 244,542, and in Germany February 6, 1895, No. 87,401.

*To all whom it may concern:*

Be it known that I, LOUIS KRIEGER, of the city of Paris, France, have invented Improvements in Electrically-Self-Propelling Vehicles, (for which I have obtained Letters Patent in Germany for fifteen years, dated February 6, 1895, No. 87,401, and in France for fifteen years, dated January 22, 1895, No. 244,542,) of which the following is a full, clear, and exact description.

This invention relates to electrical apparatus for driving vehicles, the arrangement being such that the wheels of the fore carriage of the vehicle will be driven, while at the same time allowing of the steering of the said vehicle by means of the fore carriage.

In order to enable my invention to be thoroughly understood, I shall first set forth the principle of the same and then illustrate its application to a vehicle, which may be of any suitable type.

To facilitate comprehension, I have illustrated the arrangement of my invention in the following drawings, in which—

Fig. 2 is an elevation showing the application of my apparatus to any type of vehicle.

In the drawings the same letters of reference indicate the same parts.

According to my invention the wheels of the fore carriage of a vehicle are converted into driving-wheels by driving each of them separately, either by an electric motor or by one of the armatures of a double machine.

The number of the wheels of the fore carriage may vary. When there are more than two, only one wheel on each side of the fore carriage can be driven. With this arrangement the two following conditions must be complied with: First, movement in a straight line must be retained, and, second, the fore carriage must be adapted to be steered.

Figure 1:
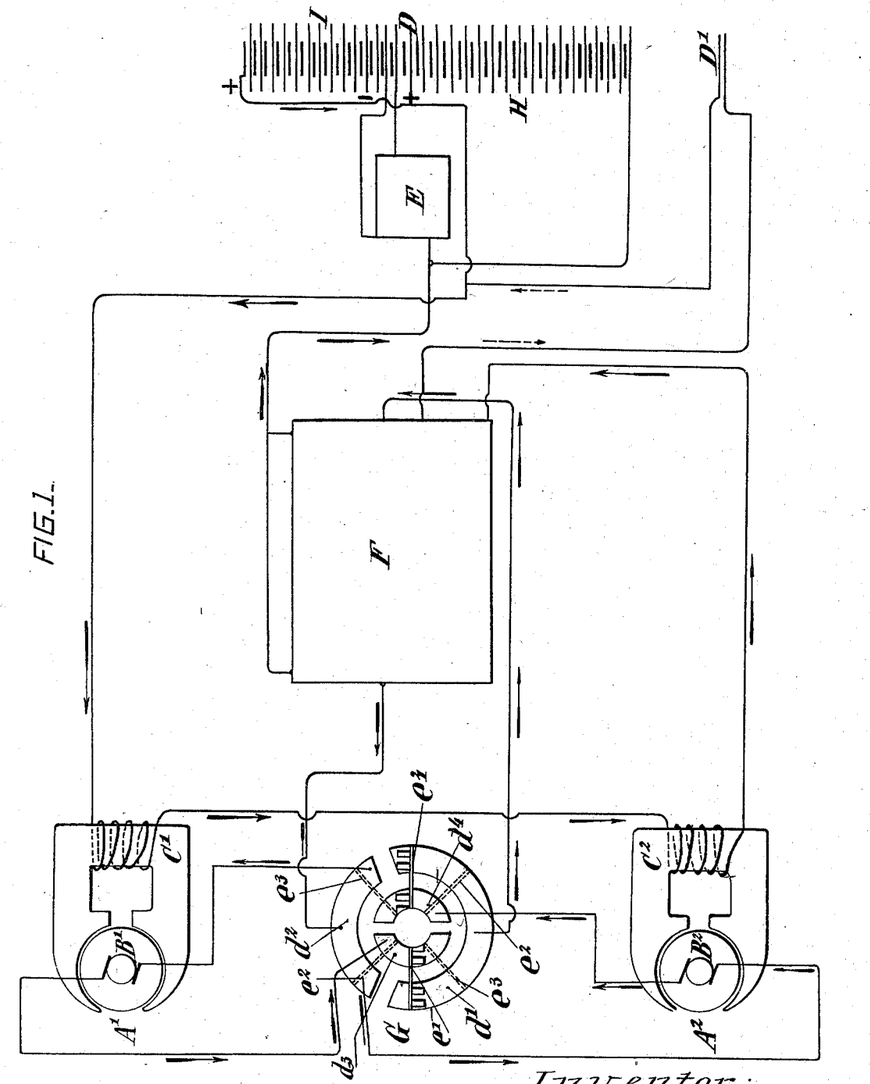
Figure 1 is a diagram of the general arrangement of my electrical apparatus.

The general arrangement of my apparatus comprises, essentially, as shown in the diagram Fig. 1, two electric motors $A'$ $A^2$, one on the right and one on the left, $B'$ $B^2$ being the armatures of the same, and $C'$ $C^2$ their field-magnets.

$D$ represents the storage battery; $E$, the coupler; $F$, a switch, and $G$ the steering apparatus or rheostat.

The current passes from the battery $D$, through the coupler $E$, through the field-magnets $C'$ $C^2$, mounted in series one after the other, and then through the switch $F$, and divides at the steering apparatus $G$ to operate the armatures $B'$ $B^2$, mounted in parallel.

The two field-magnets and rheostat are connected in series, while the rheostat is connected with the armatures in parallel. The magnetic flux is therefore the same for the two machines, and whatever their load may be they will always rotate at the same speed so long as one of them is not differently regulated. The vehicle will then travel in a straight line.

If the two windings of the field-magnets are identical, one may connect the latter together in parallel and even be enabled, by means of a coupler, to connect them together either in series or in parallel.

The field-magnet winding of each motor should be one-half weaker than that corresponding to the current passing through the armature—that is to say, if twenty-five amperes pass through the armature the field-magnet winding must be made for fifty amperes. Actually the total current passes into each field-magnet—viz., fifty amperes—so as to give twenty-five for each armature.

In a double machine there is only one field-magnet for the two armatures.

The normal progression in a straight line should be capable of being modified at will. This result is effected by means of the switch F, capable of producing in addition braking by electric means and reversal of the direction of motion.

The reversal of the direction of movement is effected by electrically braking one or other of the two electric motors by short-circuiting the corresponding armature by means of the apparatus G. This latter is provided for that purpose with four contacts $d'$ $d^2$ $d^3$ $d^4$, arranged in two annular and concentric rows. The contact $d'$ extends over slightly more than half the circumference, and the contact $d^2$ has a range slightly smaller than half the circumference. These two contacts are arranged on one and the same circumference. The two contacts $d^3$ $d^4$, which are on a circumference inside the foregoing one, have the same extent. Over these contacts there are adapted to move two rubbing-pieces $e$ $e'$, mounted on the same diameter. These two rubbing-pieces are electrically insulated and are designed to connect the two annular rows of contacts. Each of the same is capable of moving over one-quarter of a circumference to the right and to the left of the diameter, which is at right angles to the line of separation of the contacts $d^3$ $d^4$.

When the rubbing-pieces $e'$ $e'$ occupy the position shown in full lines, the two ends of the contact $d'$ are connected to the contacts $d^3$ $d^4$ and the current passes into the two armatures. The vehicle then travels in a straight line. When they occupy the position shown by dotted lines $e^2$, the current passes into the armature $B'$, but the armature $B^2$ is then short-circuited and the fore carriage turns to the right hand. When, on the contrary, they are moved into the position shown by dotted lines $e^3$, the current passes into $B^2$, while $B'$ is short-circuited and the fore carriage turns to the left hand.

The steering apparatus has its center at the point of rotation of the fore carriage. In cases where the fore carriage is provided with a swivel-pin or king-bolt or a pivot in a straight line with the centers of rotation of the wheels, if an axle with sleeves is employed, this apparatus, being fixed to the fore carriage or connected to the axle-journals, turns through the same angle as that through which the wheels turn. Therefore if the handle be turned through a certain angle, then as it is connected to the rear carriage by the arm of the driver as soon as the fore carriage has turned through that angle the rubbing-pieces $e$ $e'$ will be situated again in their position $e$ $e'$ for motion in a straight line. The fore carriage can therefore never be at a greater angle with the rear carriage than the angle which the driver imparts to the handle which serves to control the steering-gear. This arrangement thus compensates when traveling in a straight line for any accidental deviations of the fore carriage.

Figure 3:
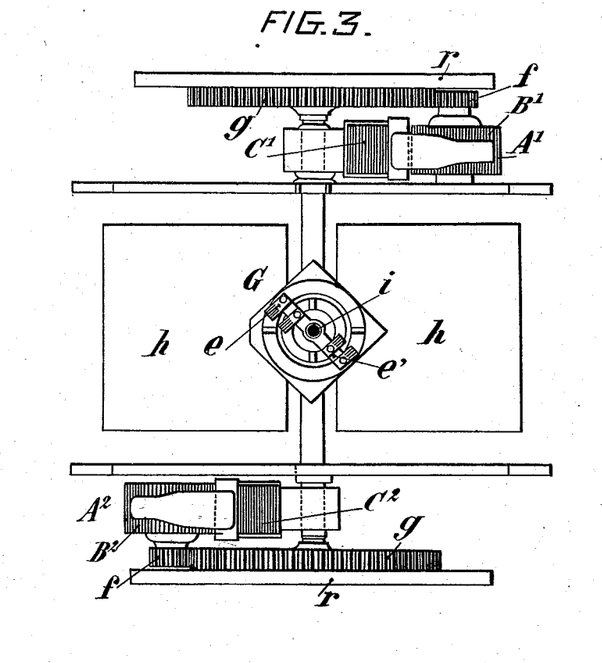
Fig. 3 is a plan of the motor fore carriage.

Figs. 2 and 3 illustrate the application of these several devices to any type of carriage.

Upon the shaft of each electric motor there is keyed a pinion $f$, gearing with a toothed wheel $g$, carried by the corresponding driving-wheel $r$ of the fore carriage.

The two electric motors are arranged at each end of the axle of the fore carriage, either one on each side or both in front or both at the rear of the said axle, or either in front or behind the same in the case of a double motor.

The accumulators are inclosed in boxes $h$, carried by the framing $i$. With the object of obviating the action of the vibration due to the inequalities of the ground the boxes $h$ may be placed on springs.

In the steering-gear G the rubbing-pieces $e$ $e'$ are mounted on an operating-shaft $i$, provided at its upper end with a handle $j$.

The coupler E enables different speeds to be obtained by grouping either in series or in quantity equal portions of the battery.

The coupler E may be fixed, for example, to the apron or the splashboard of the carriage.

The switch F is placed inside the box-seat.

The current coming from the coupler E passes first into the field-magnet $C'$, as indicated by arrows, then into the field-magnet $C^2$ and into F, then to the contact $d^2$ of the steering-gear, where it divides to go to the two armatures $B'$ $B^2$, and returns thence to the contacts $d^3$ $d^4$ of the steering-gear. If the carriage is traveling in a straight line, the current passes through the bridge-pieces $e'$ $e'$ to the contact $d'$, and thence it comes again to the switch F and returns to the coupler E. If it is desired to brake the vehicle, the current passes from the accumulator $D'$, then excites the field-magnets, and the current produced in the armatures by the momentum of the vehicle is absorbed by the resistances arranged on F until total short-circuiting is obtained. The change of direction of the armatures produces rearward travel.

The driver of the vehicle holds the lever $l$ in one hand in such a manner as to be master at all times of the speed of travel, and he holds the handle $j$ in the other hand, so as to be able to steer the vehicle. He may, in addition, have at his disposal a stopping device of any type—such, for instance, as an ordinary brake operated by a hand-wheel $t$, mounted at the side of the box-seat.

Figure 4:
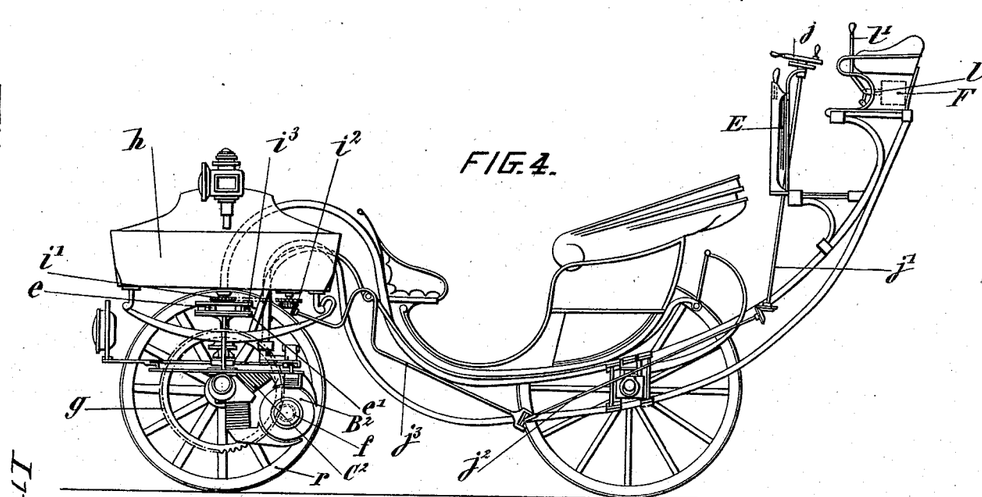
Figs. 4 and 5 are respectively an elevation and a plan of a modification in the application of my apparatus.
Figure 5:
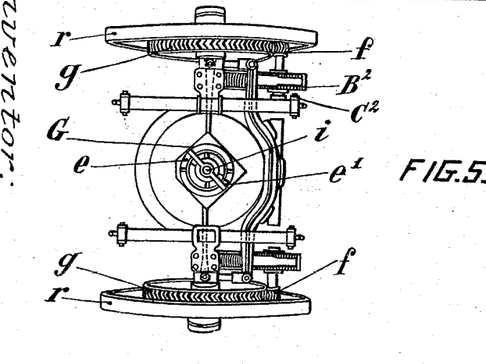

Figs. 4 and 5 illustrate a modification of my apparatus which allows the driver's seat to be arranged at the back of the vehicle. In this modification the two electric motors are situated on the same side of the axle of the fore carriage. The shaft $i$, upon which the two rubbing-pieces $e$ $e'$ of the steering apparatus G are mounted, carries a pinion $i'$, actuated by a pinion $i^2$ through the medium of a chain $i^3$. The pinion $i^2$ is operated by the hand-wheel $j$ by means of connecting-shafts $j'$ $j^2$ $j^3$, connected together by means of bevel-pinions and a universal coupling, as shown in the drawings. The other parts are similar to those hereinbefore described, and the apparatus is controlled in the same manner.

Figure 6:
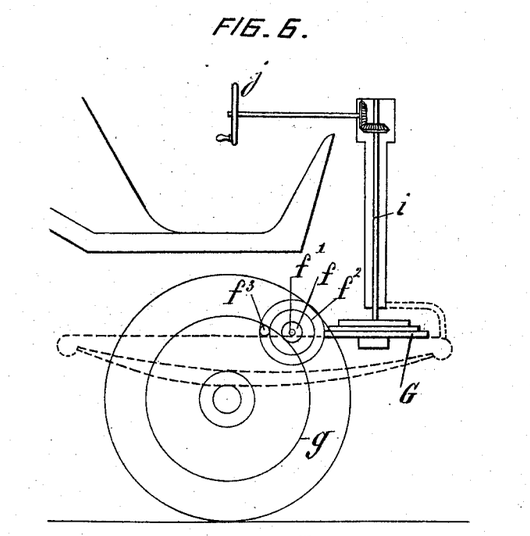
Fig. 6 shows a modification.
Figure 7:
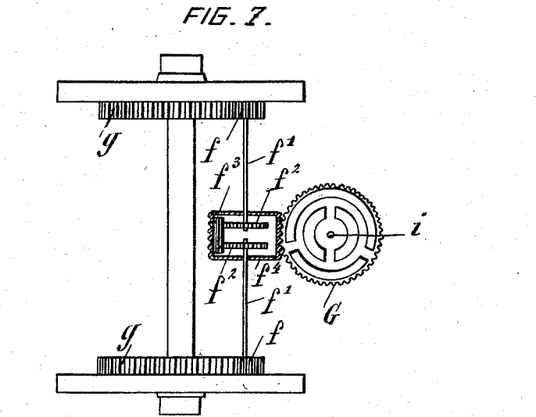
Fig. 7 is a plan.

In the case where the axle is rigid and is provided with a turning-pin the steering apparatus may be driven without making use of the rotation of the fore carriage about the said turning-pin, and thus all action of the rear carriage upon the steering of the fore carriage (such as might occur if the vehicle were to run away) can be neutralized, Figs. 6 and 7. With this object the pinions $f$, which gear into the toothed wheels $g$, driven by the motor-gears $g'$, rigidly fixed to the front wheels, are keyed on independent shafts $f'$, carrying at their other ends two small pinions $f^2$ of equal size. The latter gear into a long pinion $f^3$ or into two pinions keyed on the same axle. The journals of this pinion or of this axle are carried by a box $f^4$, which is provided externally with an endless screw and revolves idly on the axles $f'$. The endless screw gears into the plate G, carrying the contact-pieces of the steering apparatus. At a turn of the fore carriage, therefore, it will be seen that as the wheels turn at a different rate of speed the gears $g$ and $f$ will also rotate at a different rate of speed, and by means of the differential-wheel frame, made up of the pinions $f^2 f^2$ and $f^3$, a rotary movement is imparted to the box $f^4$, the amount of movement varying with the sharpness of the turn. Box $f^4$ engaging with the cog-wheel G of the direction-switch this will be moved also. This movement continues until the two wheels resume even speed. The brushes resume their original position on the contact-stud of the switch G in straight direction. The switch is thus always displaced in an angle equal to the angle at which the brushes have been displaced to make the curve. It is to be noted, further, that the driver has not to move the handle back again in order to resume the straight direction, because the rear carriage has no action upon the direction of movement. The driver may therefore be situated on the fore carriage and move with the latter, or he may be placed on the vehicle and operate the rubbing-contacts in the following manner: The spindle $i$, carrying the rubbing-contacts, is fixed at some suitable point of the fore carriage, and it moves with the latter. It is provided at its upper part with two bevel-pinions that are driven by a horizontal shaft ending in a hand fly-wheel $j$, situated in a vertical plane. The whole is held in place by means of a tube that incases the spindle $i$ and is fixed to the fore carriage. In order to turn, the driver rotates the fly-wheel $j$ in one or the other sense, the fore carriage turns, and the amount of its turning is indicated by the position of the horizontal shaft carrying the fly-wheel $j$. It is sufficient for him to cease to turn the said fly-wheel in order to proceed in the direction indicated. In steering instead of short-circuiting the armature of one of the machines the excitation of the corresponding field-magnet may be increased either by increasing the number of the convolutions of its winding or by applying an auxiliary excitation to its circuit. The arrangement of the steering apparatus is not altered in such cases, except that it is the field-magnet circuits and not the armature-circuits that are connected to the apparatus.

Figure 8:
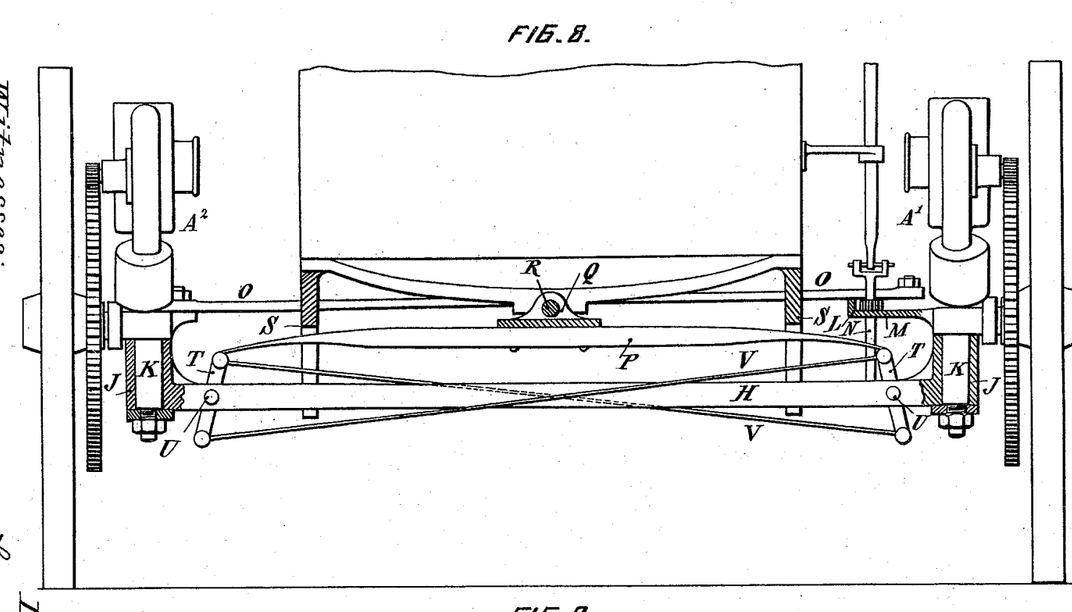
Fig. 8 illustrates the application of my invention to a case where the wheels of the fore carriage are mounted on pivots.
Figure 9:
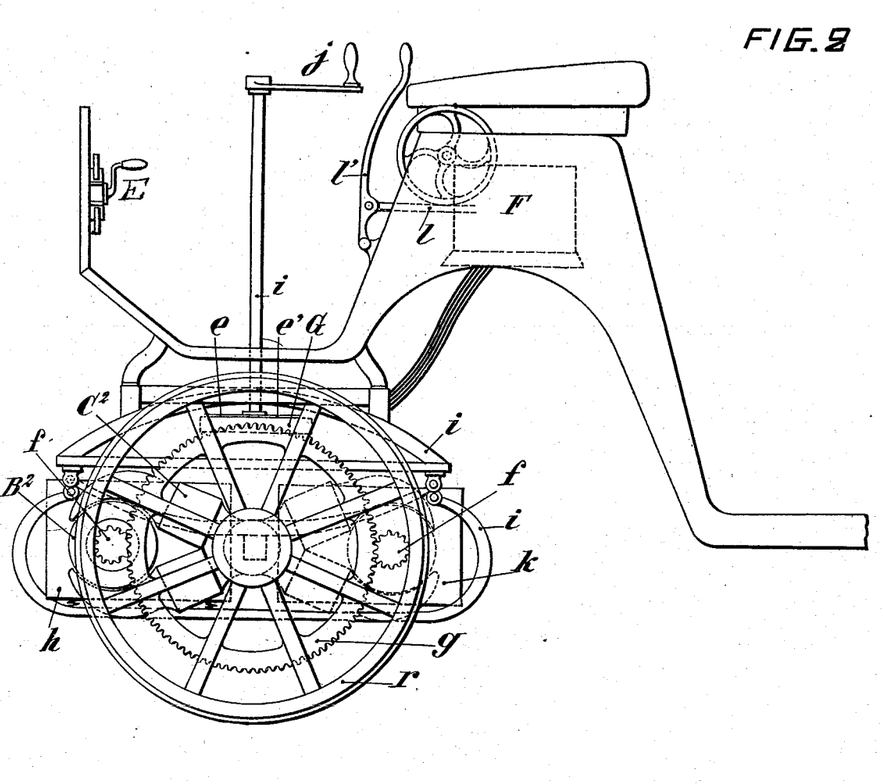
Fig. 9 is a corresponding plan.
Figure 10:
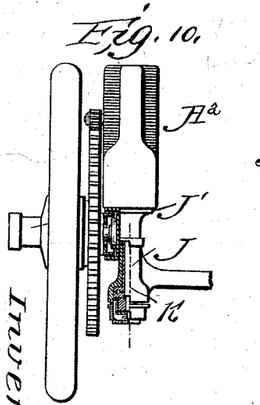
Figs. 10 and 11 are detail view illustrating the manner of mounting the motors.
Figure 11:
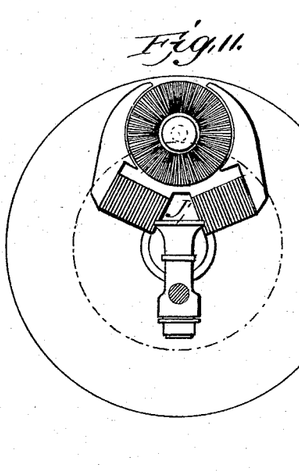
Figure 12:
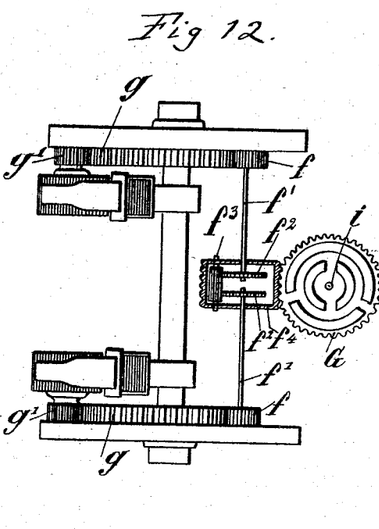
Fig. 12 is a detail view of the construction shown in Fig. 7.

My electrical apparatus may be applied not only to a fore carriage having a turning-pin, but also in those cases where the driving-wheels are mounted on pivots. In this last application I preferably employ the following arrangement, (Figs. 8 and 9:)

The axletree H of the fore carriage carries at each of its ends a sleeve J, in which rotates a pivot K, that forms one with the axle-neck of the corresponding driving-wheel. Upon these pivots are fixed the electric motors $A'$ $A^2$, each of which is arranged to drive the corresponding wheel by means of a single train of gearing having a ratio of at least one to ten. The motors thus swivel with the wheels. The entire arrangement constituted by the motor, the gearing, and the wheel is independent of the remainder of the vehicle and may be very easily removed when it is necessary to replace or repair any part.

The steering is effected by means of a sector L, having internal teeth, which is fixed on one of the axle-necks and is actuated by a pinion M, whose axle rotates in a bearing N, fixed to the axletree and connected to the steering fly-wheel by means of a Cardan or other joint allowing of the turning of the vehicle. The other axle-neck is coupled to the first axle-neck by means of a rod $o$. In the case of a steering arrangement of this kind, the power being small, the two armatures of the dynamos may be mounted in series.

The axletree H of the fore carriage is connected to the body of the vehicle by means of a transverse spring P, fixed at its center by means of a shoe Q in such a manner as to be capable of becoming inclined to the right or to the left in a plane at right angles to the vehicle by rocking about a longitudinal axle R, fixed to the body. This arrangement allows the front axletree to assume inclinations to suit the inequalities of the ground. This axletree is kept in the direction of the travel by means of two horn-plates S, fixed to the body.

The transverse spring rests upon the axletree through the medium of two connecting-rods T, capable of rocking about their axles U and connected together at their ends by means of two diagonal rods V. This arrangement has for its object to prevent lateral movement of the front axletree relative to the vehicle. The two connecting-rods T can, indeed, become inclined together and in opposite directions to the same extent when the spring P is deflected; but in consequence of their diagonal connection they cannot become inclined in the same direction, and consequently the center of the axletree always remains opposite to the center of the spring.

I claim—

1. In an electrically-self-propelled vehicle, the combination with the steering-wheels, of an independent armature connected to each wheel, a fixed magnet in conjunction with each armature, a rheostat having independent electric connections to each armature, and a source of electrical energy, the field-magnet windings and the rheostat being connected in series with the source of electrical energy, substantially as described.

2. In an electrically-self-propelled vehicle, the combination with the steering-wheels of a mechanically-independent motor for operating each wheel, a source of electrical energy, a rheostat comprising the plates $d'$ $d^2$ and $d^3$ $d^4$ electrical connections in parallel from the plate $d^2$ to the armatures of both motors, electrical connections for connecting the field-magnets and the rheostat in series with the source of electrical energy, and the movable contacts operating in conjunction with the plates to short-circuit either armature for steering the vehicle, substantially as described.

3. In an electrically-propelled vehicle, the combination with the steering-wheels, of a mechanically-independent motor connected with each wheel, a movable rheostat-plate G carrying suitable contact-plates, manually operated, contacts coöperating with said rheostat for varying the speed of either motor for steering the vehicle, and connections from each steering-wheel to said movable rheostat-plate whereby the increase of speed of one wheel will operate to turn said movable plate, substantially as described.

4. In an electrically-self-propelled vehicle, the combination with the steering-wheels, of a mechanically-independent motor connected to each wheel, a movable rheostat-plate G carrying suitable contact-plates, manually operated, contacts coöperating with said contact-plates to vary the speed of either motor to steer the vehicle, and means whereby such increased speed will turn the plate G comprising a hollow worm geared to said plate G, an idler-gear within said hollow worm, a pair of independent gears engaging said idler, and operating connections from each of said gears to one of the steering-wheels, substantially as described.

5. In an electrically-self-propelled vehicle, the combination with steering-wheels pivotally journaled upon opposite ends of a stationary axle, an electric motor connected to each wheel, and means for varying the speed of either motor to steer the vehicle, substantially as described.

The foregoing specification of my improvements in electrically-self-propelling vehicles signed by me this 16th day of January, 1897.

LOUIS KRIEGER.

Witnesses:
   J. ALLISON BOWEN,
   MAURICE PIGNET.